(12) United States Patent
Cross, Jr.

(10) Patent No.: US 8,909,532 B2
(45) Date of Patent: Dec. 9, 2014

(54) SUPPORTING MULTI-LINGUAL USER INTERACTION WITH A MULTIMODAL APPLICATION

(75) Inventor: Charles W. Cross, Jr., Wellington, FL (US)

(73) Assignee: Nuance Communications, Inc., Burlington, MA (US)

( * ) Notice: Subject to any disclaimer, the term of this patent is extended or adjusted under 35 U.S.C. 154(b) by 1498 days.

(21) Appl. No.: 11/690,423

(22) Filed: Mar. 23, 2007

(65) Prior Publication Data

US 2008/0235027 A1 Sep. 25, 2008

(51) Int. Cl.
*G10L 21/00* (2013.01)
*G10L 15/22* (2006.01)

(52) U.S. Cl.
CPC ........................... *G10L 15/22* (2013.01)
USPC ........ 704/270.1; 704/231; 704/235; 704/257; 704/270

(58) Field of Classification Search
CPC ..... G10L 15/005; G10L 15/265; G10L 15/02; H04M 2201/40; H04M 3/493; H04M 3/51
USPC ............ 704/8, 251, 270, 270.1, 275; 715/234
See application file for complete search history.

(56) References Cited

U.S. PATENT DOCUMENTS

| | | | |
|---|---|---|---|
| 5,577,165 A | 11/1996 | Takebayashi et al. | |
| 5,584,052 A | 12/1996 | Galau et al. | |
| 5,794,218 A * | 8/1998 | Jennings et al. | 705/35 |
| 5,969,717 A | 10/1999 | Ikemoto | |
| 6,208,972 B1 | 3/2001 | Grant et al. | |
| 6,243,375 B1 | 6/2001 | Speicher | |
| 6,275,806 B1 | 8/2001 | Pertrushin | |
| 6,301,560 B1 | 10/2001 | Masters | |

(Continued)

FOREIGN PATENT DOCUMENTS

| | | |
|---|---|---|
| CN | 1385783 | 12/2002 |
| CN | 1385783 A | 12/2002 |

(Continued)

OTHER PUBLICATIONS

Cordoba et al. "Implementation of dialog applications in an open-source VoiceXML platform." In: Proc. Internat. Conf. of Spoken Language Processing (ICSLP), Oct. 2004, pp. 257-260.*

(Continued)

*Primary Examiner* — Richemond Dorvil
*Assistant Examiner* — Mark Villena
(74) *Attorney, Agent, or Firm* — Wolf, Greenfield & Sacks, P.C.

(57) ABSTRACT

Methods, apparatus, and products are disclosed for supporting multi-lingual user interaction with a multimodal application, the application including a plurality of VoiceXML dialogs, each dialog characterized by a particular language, supporting multi-lingual user interaction implemented with a plurality of speech engines, each speech engine having a grammar and characterized by a language corresponding to one of the dialogs, with the application operating on a multimodal device supporting multiple modes of interaction including a voice mode and one or more non-voice modes, the application operatively coupled to the speech engines through a VoiceXML interpreter, the VoiceXML interpreter: receiving a voice utterance from a user; determining in parallel, using the speech engines, recognition results for each dialog in dependence upon the voice utterance and the grammar for each speech engine; administering the recognition results for the dialogs; and selecting a language for user interaction in dependence upon the administered recognition results.

21 Claims, 5 Drawing Sheets

(56) References Cited

U.S. PATENT DOCUMENTS

| | | | |
|---|---|---|---|
| 6,513,011 B1 | 1/2003 | Uwakubo | |
| 6,606,599 B2 | 8/2003 | Grant et al. | |
| 6,701,293 B2* | 3/2004 | Bennett et al. | 704/251 |
| 6,801,604 B2* | 10/2004 | Maes et al. | 379/88.17 |
| 6,856,960 B1 | 2/2005 | Dragosh et al. | |
| 6,920,425 B1 | 7/2005 | Will et al. | |
| 6,999,930 B1 | 2/2006 | Roberts et al. | |
| 7,035,805 B1 | 4/2006 | Miller | |
| 7,072,984 B1* | 7/2006 | Polonsky et al. | 709/246 |
| 7,142,661 B2* | 11/2006 | Erhart et al. | 379/265.09 |
| 7,150,399 B2 | 12/2006 | Barrus et al. | |
| 7,171,243 B2 | 1/2007 | Watanabe et al. | |
| 7,171,361 B2* | 1/2007 | Thomas et al. | 704/251 |
| 7,188,067 B2 | 3/2007 | Grant et al. | |
| 7,330,890 B1 | 2/2008 | Partovi et al. | |
| 7,376,586 B1 | 5/2008 | Partovi et al. | |
| 7,487,085 B2 | 2/2009 | Cross | |
| 2002/0065944 A1 | 5/2002 | Hickey et al. | |
| 2002/0092019 A1 | 7/2002 | Marcus | |
| 2002/0099553 A1 | 7/2002 | Brittan et al. | |
| 2002/0120554 A1 | 8/2002 | Vega | |
| 2002/0147593 A1 | 10/2002 | Lewis et al. | |
| 2002/0184610 A1 | 12/2002 | Chong et al. | |
| 2003/0039341 A1 | 2/2003 | Burg et al. | |
| 2003/0046316 A1 | 3/2003 | Gergic et al. | |
| 2003/0046346 A1 | 3/2003 | Mumick et al. | |
| 2003/0101451 A1 | 5/2003 | Bentolila et al. | |
| 2003/0125945 A1 | 7/2003 | Doyle | |
| 2003/0179865 A1 | 9/2003 | Stillman et al. | |
| 2003/0182622 A1 | 9/2003 | Sibal et al. | |
| 2003/0195739 A1 | 10/2003 | Washio | |
| 2003/0217161 A1 | 11/2003 | Balasuriya | |
| 2003/0229900 A1 | 12/2003 | Reisman | |
| 2003/0235282 A1 | 12/2003 | Sichelman et al. | |
| 2004/0019487 A1 | 1/2004 | Kleindienst et al. | |
| 2004/0025115 A1 | 2/2004 | Sienel et al. | |
| 2004/0031058 A1 | 2/2004 | Reisman | |
| 2004/0044516 A1 | 3/2004 | Kennewick et al. | |
| 2004/0049390 A1 | 3/2004 | Brittan et al. | |
| 2004/0059705 A1 | 3/2004 | Wittke et al. | |
| 2004/0083109 A1 | 4/2004 | Halonen et al. | |
| 2004/0120472 A1 | 6/2004 | Popay et al. | |
| 2004/0120476 A1 | 6/2004 | Harrison et al. | |
| 2004/0138890 A1 | 7/2004 | Ferrans et al. | |
| 2004/0153323 A1 | 8/2004 | Charney et al. | |
| 2004/0179038 A1 | 9/2004 | Blattner et al. | |
| 2004/0216036 A1 | 10/2004 | Chu et al. | |
| 2004/0236574 A1 | 11/2004 | Ativanichayaphong | |
| 2004/0260562 A1 | 12/2004 | Kijirai | |
| 2005/0075884 A1 | 4/2005 | Badt | |
| 2005/0091059 A1 | 4/2005 | Lecoeuche | |
| 2005/0131701 A1 | 6/2005 | Cross | |
| 2005/0138219 A1 | 6/2005 | Boughannam et al. | |
| 2005/0138647 A1 | 6/2005 | Boughannam et al. | |
| 2005/0154580 A1 | 7/2005 | Horowitz et al. | |
| 2005/0160461 A1 | 7/2005 | Baumgartner et al. | |
| 2005/0188412 A1 | 8/2005 | Dacosta | |
| 2005/0203729 A1 | 9/2005 | Roth et al. | |
| 2005/0203747 A1 | 9/2005 | Lecoeuche | |
| 2005/0261908 A1 | 11/2005 | Cross | |
| 2005/0273769 A1 | 12/2005 | Eichenberger | |
| 2005/0283367 A1 | 12/2005 | Cross | |
| 2006/0047510 A1 | 3/2006 | Cross | |
| 2006/0064302 A1 | 3/2006 | Cross | |
| 2006/0069564 A1 | 3/2006 | Allison et al. | |
| 2006/0074680 A1 | 4/2006 | Cross | |
| 2006/0075120 A1 | 4/2006 | Smit | |
| 2006/0111906 A1 | 5/2006 | Cross | |
| 2006/0122836 A1 | 6/2006 | Cross | |
| 2006/0123358 A1 | 6/2006 | Lee et al. | |
| 2006/0136220 A1* | 6/2006 | Gurram et al. | 704/275 |
| 2006/0136222 A1 | 6/2006 | Cross | |
| 2006/0146728 A1 | 7/2006 | Engelsma et al. | |
| 2006/0168095 A1 | 7/2006 | Sharma et al. | |
| 2006/0168595 A1 | 7/2006 | McArdle | |
| 2006/0184626 A1 | 8/2006 | Agapi | |
| 2006/0190264 A1 | 8/2006 | Jaramillo | |
| 2006/0218039 A1 | 9/2006 | Johnson | |
| 2006/0229880 A1 | 10/2006 | White | |
| 2006/0235694 A1 | 10/2006 | Cross | |
| 2006/0287845 A1 | 12/2006 | Cross et al. | |
| 2006/0287865 A1 | 12/2006 | Cross et al. | |
| 2006/0287866 A1 | 12/2006 | Cross et al. | |
| 2006/0288309 A1 | 12/2006 | Cross et al. | |
| 2007/0265851 A1 | 11/2007 | Cross et al. | |
| 2007/0274296 A1 | 11/2007 | Cross et al. | |
| 2007/0274297 A1 | 11/2007 | Cross et al. | |
| 2007/0288241 A1 | 12/2007 | Cross et al. | |
| 2007/0294084 A1 | 12/2007 | Cross | |
| 2008/0065386 A1 | 3/2008 | Cross et al. | |
| 2008/0065387 A1 | 3/2008 | Cross et al. | |
| 2008/0065388 A1 | 3/2008 | Cross et al. | |
| 2008/0065389 A1 | 3/2008 | Cross et al. | |
| 2008/0065390 A1 | 3/2008 | Ativanichayaphong et al. | |
| 2008/0086564 A1 | 4/2008 | Putman et al. | |
| 2008/0140410 A1 | 6/2008 | Cross et al. | |
| 2008/0162136 A1 | 7/2008 | Ativanichayaphong et al. | |
| 2008/0177530 A1 | 7/2008 | Cross et al. | |
| 2008/0195393 A1 | 8/2008 | Cross et al. | |
| 2008/0208584 A1 | 8/2008 | Cross et al. | |
| 2008/0208585 A1 | 8/2008 | Ativanichayaphong et al. | |
| 2008/0208586 A1 | 8/2008 | Ativanichayaphong et al. | |
| 2008/0208587 A1 | 8/2008 | Cross et al. | |
| 2008/0208588 A1 | 8/2008 | Cross et al. | |
| 2008/0208589 A1 | 8/2008 | Cross et al. | |
| 2008/0208590 A1 | 8/2008 | Cross et al. | |
| 2008/0208591 A1 | 8/2008 | Ativanichayaphong et al. | |
| 2008/0208592 A1 | 8/2008 | Cross et al. | |
| 2008/0208593 A1 | 8/2008 | Ativanichayaphong et al. | |
| 2008/0208594 A1 | 8/2008 | Cross et al. | |
| 2008/0228494 A1 | 9/2008 | Cross et al. | |
| 2008/0228495 A1 | 9/2008 | Cross et al. | |
| 2008/0235021 A1 | 9/2008 | Cross et al. | |
| 2008/0235022 A1 | 9/2008 | Cross et al. | |
| 2008/0235027 A1 | 9/2008 | Cross | |
| 2008/0235029 A1 | 9/2008 | Cross et al. | |
| 2008/0249782 A1 | 10/2008 | Ativanichayaphong et al. | |
| 2008/0255850 A1 | 10/2008 | Cross et al. | |
| 2008/0255851 A1 | 10/2008 | Cross et al. | |

FOREIGN PATENT DOCUMENTS

| | | | |
|---|---|---|---|
| CN | 1564123 A | 1/2005 | |
| EP | 0794670 A | 9/1997 | |
| EP | 1450350 | 8/2004 | |
| EP | 0507148.5 | 4/2005 | |
| JP | 2000155529 A | 6/2000 | |
| JP | 02003140672 A | 5/2003 | |
| JP | 2005017620 A * | 1/2005 | G10L 15/10 |
| WO | WO 99/48088 | 9/1999 | |
| WO | WO 0051106 A | 8/2000 | |
| WO | WO 02/32140 A | 4/2002 | |
| WO | WO 2004/062945 A | 7/2004 | |
| WO | WO2006108795 | 10/2006 | |

OTHER PUBLICATIONS

Schulz et al. "A Spoken Language Front-end for a Multilingual Music Data Base." In Proceedings of the Berliner XMLTage, Berlin, Germany, 2004, pp. 1-9.*

López-Cózar et al. "Multimodal, multilingual and adaptive dialogue system for ubiquitous interaction in educational space," in Proc.of Applied Spoken Language Interaction in Distributed Environments (ASIDE), Aalborg (Denmark), 2005, pp. 1-4.*

U.S. Appl. No. 10/919,005, filed Dec. 2005, Eichenberger, et al.

U.S. Appl. No. 12/109,151, filed Apr. 2008, Agapi, et al.

U.S. Appl. No. 12/109,167, filed Apr. 2008, Agapi, et al.

U.S. Appl. No. 12/109,204, filed Apr. 2008, Agapi, et al.

U.S. Appl. No. 12/109,227, filed Apr. 2008, Agapi, et al.

U.S. Appl. No. 12/109,214, filed Apr. 2008, Agapi, et al.

(56) References Cited

OTHER PUBLICATIONS

Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005, pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. ; PCT/EP2008/051358.

PCT Search Report, Jun. 18, 2008; PCT Application No. ; PCT/EP2008/051363.

Didier Guillevic, et al.,Robust Semantic Confidence Scoring ICSLP 2002: 7*th* International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

U.S. Appl. No. 10/924,520, filed Aug. 24, 2004, Charles W. Cross, Jr.
U.S. Appl. No. 10/945,112, filed Sep. 20, 2004, Charles W. Cross, Jr.
U.S. Appl. No. 10/870,517, filed Jun. 17, 2004, Charles W. Cross, Jr.
U.S. Appl. No. 10/441,839, filed May 20, 2003, S. Ativanichayaphong.
U.S. Appl. No. 11/062,731, filed Feb. 22, 2005, David Jaramillo.
U.S. Appl. No. 11/007,830, filed Dec. 8, 2004, Charles W. Cross, Jr.
U.S. Appl. No. 10/945,119, filed Sep. 20, 2004, Charles W. Cross, Jr.
U.S. Appl. No. 11/022,464, filed Dec. 22, 2004, Charles W. Cross, Jr.
U.S. Appl. No. 10/741,997, filed Dec. 19, 2003, Akram Boughannam.
U.S. Appl. No. 10/741,499, filed Dec. 19, 2003, Akram Boughannam.
U.S. Appl. No. 11/056,493, filed Feb. 11, 2005, Ciprian Agapi.
U.S. Appl. No. 11/093,545, filed Mar. 30, 2005, Marc White.
U.S. Appl. No. 11/105,865, filed Apr. 14, 2005, Charles W. Cross, Jr.
U.S. Appl. No. 10/849,642, filed May 19, 2004, Charles W. Cross, Jr.
U.S. Appl. No. 10/992,979, filed Nov. 19, 2004, Charles W. Cross, Jr.
U.S. Appl. No. 10/733,610, filed Oct. 19, 2006, Ronald J. Bowater.

* cited by examiner

SUPPORTING MULTI-LINGUAL USER INTERACTION WITH A MULTIMODAL APPLICATION

BACKGROUND OF THE INVENTION

1. Field of the Invention

The field of the invention is data processing, or, more specifically, methods, apparatus, and products for supporting multi-lingual user interaction with a multimodal application.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standards to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Current multimodal applications typically provide user interaction in only a single language. When a software architect desires to provide user interaction in more than one language, the software architect often writes a multimodal application for each language separately and provides a menu interface to a user that permits the user to select the language that the user prefers. Upon receiving the user's selection of a language preference, the menu interface routes the user to the multimodal application written in the language corresponding to the user's language preference. The drawback to such a system is that having multiple versions of the same multimodal application in various languages increases complexity, which invites errors and additional costs into the system. Furthermore, the menu interface in current systems reduces flexibility and requires the user to manually select the user's language preference. As such, readers will appreciate that room for improvement exists in supporting multi-lingual user interaction with a multimodal application.

SUMMARY OF THE INVENTION

Methods, apparatus, and products are disclosed for supporting multi-lingual user interaction with a multimodal application, the application including a plurality of VoiceXML dialogs, each dialog characterized by a particular language, supporting multi-lingual user interaction implemented with a plurality of speech engines, each speech engine having a grammar and characterized by a language corresponding to one of the dialogs, with the application operating on a multimodal device supporting multiple modes of interaction including a voice mode and one or more non-voice modes, the application operatively coupled to the speech engines through a VoiceXML interpreter, the VoiceXML interpreter: receiving a voice utterance from a user; determining in parallel, using the speech engines, recognition results for each dialog in dependence upon the voice utterance and the grammar for each speech engine; administering the recognition results for the dialogs; and selecting a language for user interaction in dependence upon the administered recognition results.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
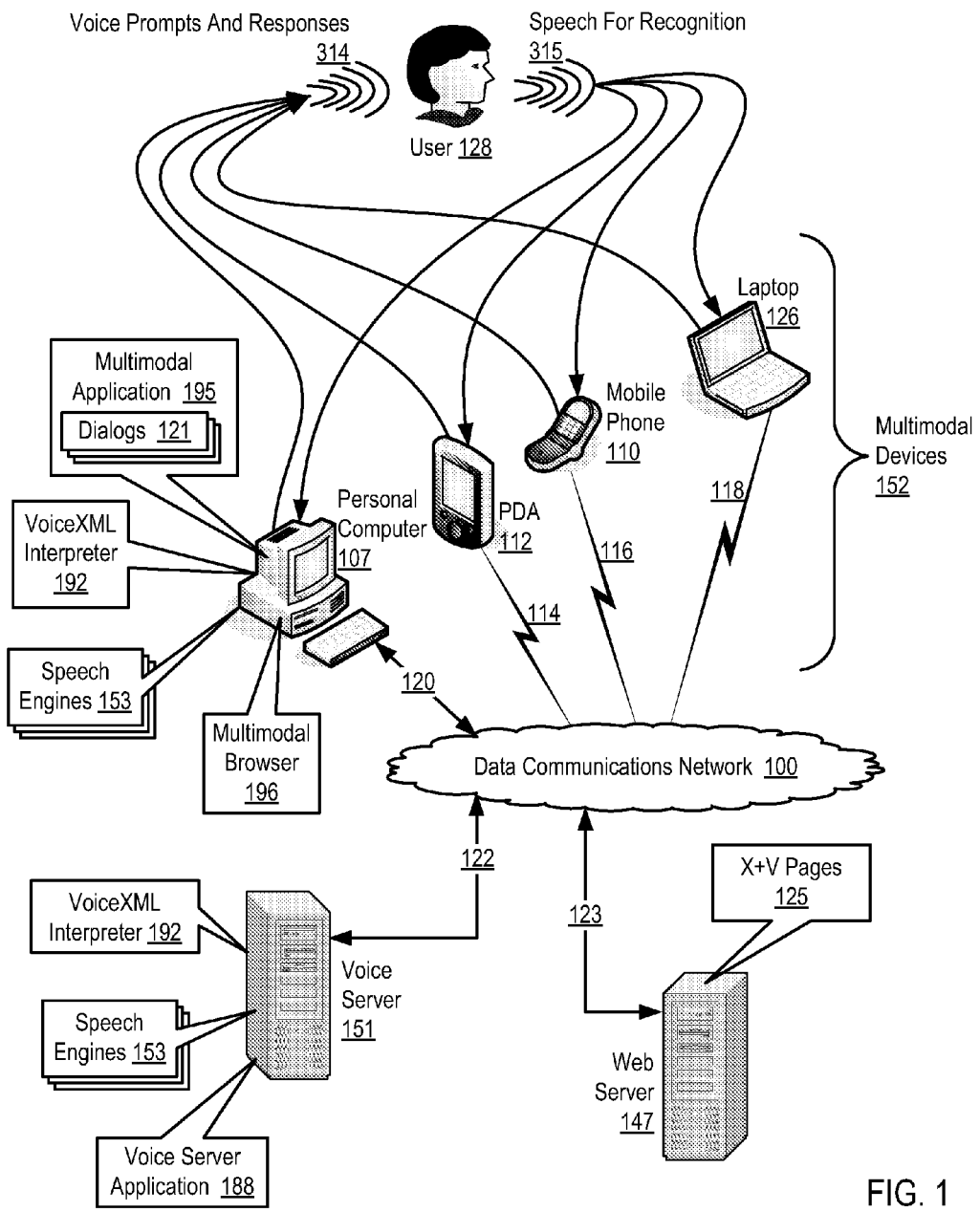
FIG. 1 sets forth a network diagram illustrating an exemplary system for supporting multi-lingual user interaction with a multimodal application according to embodiments of the present invention.

Exemplary methods, apparatus, and products for supporting multi-lingual user interaction with a multimodal application according to embodiments of the present invention are described with reference to the accompanying drawings, beginning with FIG. 1. FIG. 1 sets forth a network diagram illustrating an exemplary system for supporting multi-lingual user interaction with a multimodal application (195) according to embodiments of the present invention. The multimodal application (195) of FIG. 1 is composed of one or more X+V pages that include a plurality of VoiceXML dialogs (121). A VoiceXML dialog is a set of instructions for presenting information to a user and collecting data from the user. A VoiceXML dialog may be implemented using the VoiceXML <form> element described in Version 2.0 of the VoiceXML specification promulgated by the W3C organization. In the example of FIG. 1, each VoiceXML dialog (121) is characterized by a particular language. For example, a first VoiceXML dialog may support user interaction in American English, a second VoiceXML dialog may support user interaction in British English, a third VoiceXML dialog may support user interaction in French, a fourth VoiceXML dialog may support user interaction in Spanish, and so on. In such a manner, each VoiceXML dialog included in the multimodal application (195) may be tailored to a specific language or dialect of a language.

Supporting multi-lingual user interaction with a multimodal application in this example is implemented with a multimodal application (195) operating in a multimodal browser (196) on a multimodal device (152). The multimodal device (152) supports multiple modes of interaction including a voice mode and one or more non-voice modes of user interaction with the multimodal application (195). The voice mode is represented here with audio output of voice prompts and responses (177) from the multimodal devices and audio input of speech for recognition (315) from a user (128). Non-voice modes are represented by input/output devices such as keyboards and display screens on the multimodal devices (152). The multimodal application (195) is operatively coupled to a plurality of speech engines (153) through a VoiceXML interpreter (192). The operative coupling may be implemented with an application programming interface ('API'), a voice service module, or a VOIP connection as explained more detail below.

Supporting multi-lingual user interaction with a multimodal application (195) is implemented with a grammar of the multimodal application (195) in each of a plurality of speech engines (153). Each grammar communicates to its corresponding speech engine (153) the words and sequences of words that currently may be recognized. Each grammar is implemented in a particular language to support multi-lingual user interaction with the multimodal application (195). Each grammar includes grammar rules that advise a speech engine or a voice interpreter which words and word sequences presently can be recognized. Grammars for use according to embodiments of the present invention may be expressed in any format supported by an speech engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V <form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> = [remind me to] call | phone | telephone <name> <
    when>;
    <name> = bob | martha | joe | pete | chris | john | artoush | tom;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises a speech engine or a VoiceXML interpreter which words presently can be recognized. In the example above, rule expansions includes conjunction and disjunction, and the vertical bars '|' mean 'or.' A speech engine or a VoiceXML interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush' or 'tom,' and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

As mentioned above, the multimodal application (196) operates in the multimodal browser (196), which provides an execution environment for the multimodal application (195). To support the multimodal browser (196) in processing the multimodal application (195), the system of FIG. 1 includes a VoiceXML interpreter (192). The VoiceXML interpreter (192) is a software module of computer program instructions that accepts VoiceXML dialog from a multimodal application, typically in the form of a VoiceXML <form> element. A VoiceXML dialog includes instructions in the form of one or more grammars, data input elements, event handlers, and so on, that advise the VoiceXML interpreter (192) how to administer voice input from a user and voice prompts and responses to be presented to a user. The VoiceXML interpreter (192) administers such dialogs (121) by processing each dialog sequentially in accordance with VoiceXML Form Interpretation Algorithms ('FIA'). In the example of FIG. 1, the VoiceXML interpreter (192) instantiates a separate FIA for each of the Voice XML dialogs (121) and processes each Voice XML dialog (121) characterized by a different language in parallel.

The VoiceXML interpreter (192) of FIG. 1 is improved for supporting multi-lingual user interaction with a multimodal application (195) according to embodiments of the present invention. The VoiceXML interpreter (192) may operate generally for supporting multi-lingual user interaction with a multimodal application (195) according to embodiments of the present invention by: receiving, by the VoiceXML interpreter (192), a voice utterance from a user; determining in parallel, by the VoiceXML interpreter (192) using the speech engines (153), recognition results for each VoiceXML dialog (121) in dependence upon the voice utterance and the grammar (104) for each speech engine (153); administering, by the VoiceXML interpreter (192), the recognition results for the VoiceXML dialogs (121); and selecting, by the VoiceXML interpreter (192), a language for user interaction in dependence upon the administered recognition results.

A multimodal device on which a multimodal application operates is an automated device, that is, automated computing machinery or a computer program running on an automated device, that is capable of accepting from users more than one mode of input, keyboard, mouse, stylus, and so on, including speech input—and also providing more than one mode of output such as, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, a multimodal application may refer to any software application, server-oriented or client-oriented, thin client or thick client, that administers more than one mode of input and more than one mode of output, typically including visual and speech modes.

The system of FIG. 1 includes several example multimodal devices:
personal computer (107) which is coupled for data communications to data communications network (100) through wireline connection (120),
personal digital assistant ('PDA') (112) which is coupled for data communications to data communications network (100) through wireless connection (114),
mobile telephone (110) which is coupled for data communications to data communications network (100) through wireless connection (116), and
laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled
    RTP Payload Format for European Telecommunications Standards Institute (ETSI) European Standard ES 201 108 Distributed Speech Recognition Encoding
and the Internet Draft entitled
    RTP Payload Formats for European Telecommunications Standards Institute (ETSI) European Standard ES 202 050, ES 202 211, and ES 202 212 Distributed Speech Recognition Encoding,
the IETF provides standard RTP payload formats for various codecs. It is useful to note, therefore, that there is no limitation in the present invention regarding codecs, payload formats, or packet structures. Speech for supporting multi-lingual user interaction with a multimodal application according to embodiments of the present invention may be encoded with any codec, including, for example:
    AMR (Adaptive Multi-Rate Speech coder)
    ARDOR (Adaptive Rate-Distortion Optimized sound codeR),
    Dolby Digital (A/52, AC3),
    DTS (DTS Coherent Acoustics),
    MP1 (MPEG audio layer-1),
    MP2 (MPEG audio layer-2) Layer 2 audio codec (MPEG-1, MPEG-2 and non-ISO MPEG-2.5),
    MP3 (MPEG audio layer-3) Layer 3 audio codec (MPEG-1, MPEG-2 and non-ISO MPEG-2.5),
    Perceptual Audio Coding,
    FS-1015 (LPC-10),
    FS-1016 (CELP),
    G.726 (ADPCM),
    G.728 (LD-CELP),
    G.729 (CS-ACELP),
    GSM,
    HILN (MPEG-4 Parametric audio coding), and
    others as may occur to those of skill in the art.

As mentioned above, supporting multi-lingual user interaction with a multimodal application (195) according to embodiments of the present invention is implemented with a plurality of speech engine (153), each speech engine (153) having a grammar and characterized by a language corresponding to one of the VoiceXML dialogs (121). Each speech engine (153) of FIG. 1 is a functional module, typically a software module, although it may include specialized hardware also, that does the work of recognizing and generating or 'synthesizing' human speech. Each speech engine (153) implements speech recognition by use of a further module referred to in this specification as an automatic speech recognition ('ASR') engine, and the speech engine carries out speech synthesis by use of a further module referred to in this specification as a text-to-speech ('TTS') engine. As shown in FIG. 1, the speech engines (153) may be installed locally in the multimodal device (107) itself, or the speech engines (153) may be installed remotely with respect to the multimodal device, across a data communications network (100) in a voice server (151). A multimodal device that itself contains its own speech engines is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engines is said to implement a 'thin multimodal client' or simply a 'thin client,' because the thin multimodal client itself contains only a relatively thin layer of multimodal application software that obtains speech recognition and speech synthesis services from a voice server located remotely across a network from the thin client. For ease of explanation, only one (107) of the multimodal devices (152) in the system of FIG. 1 is shown with a speech engine (153), but readers will recognize that any multimodal device may have a speech engine according to embodiments of the present invention.

A multimodal application (195) in this example provides speech for recognition and text for speech synthesis to a speech engine through the VoiceXML interpreter (192). As shown in FIG. 1, the VoiceXML interpreter (192) may be installed locally in the multimodal device (107) itself, or the VoiceXML interpreter (192) may be installed remotely with respect to the multimodal device, across a data communications network (100) in a voice server (151). In a thick client architecture, a multimodal device (152) includes both its own speech engines (153) and its own VoiceXML interpreter (192). The VoiceXML interpreter (192) exposes an API to the multimodal application (195) for use in providing speech recognition and speech synthesis for the multimodal application. The multimodal application (195) provides VoiceXML dialog instructions, VoiceXML <form> elements, grammars, input elements, event handlers, and so on, through the API to the VoiceXML interpreter, and the VoiceXML interpreter (192) administers the speech engines (153) on behalf of the multimodal application (195). In the thick client architecture, VoiceXML dialogs (121) are interpreted by a VoiceXML interpreter (192) on the multimodal device (152). In the thin client architecture, VoiceXML dialogs (121) are interpreted by a VoiceXML interpreter (192) on a voice server (151) located remotely across a data communications network (100) from the multimodal device (152) running the multimodal application (195).

The VoiceXML interpreter (192) provides grammars, speech for recognition, and text prompts for speech synthesis to the speech engines (153), and the VoiceXML interpreter (192) returns to the multimodal application output from the speech engines (153) in the form of recognized speech, semantic interpretation results, and digitized speech for voice prompts. In a thin client architecture, the VoiceXML interpreter (192) is located remotely from the multimodal client device in a voice server (151), the API for the VoiceXML interpreter is still implemented in the multimodal device (152), with the API modified to communicate voice dialog instructions, speech for recognition, and text and voice prompts to and from the VoiceXML interpreter on the voice server (151). For ease of explanation, only one (107) of the multimodal devices (152) in the system of FIG. 1 is shown with a VoiceXML interpreter (192), but readers will recognize that any multimodal device may have a VoiceXML interpreter according to embodiments of the present invention. Each of the example multimodal devices (152) in the system of FIG. 1 may be configured to order recognition results produced by an automatic speech recognition ('ASR') engine for a multimodal application by installing and running on the multimodal device a VoiceXML interpreter that orders recognition results produced by an automatic speech recognition ('ASR') engine according to embodiments of the present invention.

The use of these four exemplary multimodal devices (152) is for explanation only, not for limitation of the invention. Any automated computing machinery capable of accepting speech from a user, providing the speech digitized to an ASR engine through a VoiceXML interpreter, and receiving and playing speech prompts and responses from the VoiceXML interpreter may be improved to function as a multimodal device according to embodiments of the present invention.

The system of FIG. 1 also includes a voice server (151), which is connected to data communications network (100) through wireline connection (122). The voice server (151) is a computer that runs speech engines (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152) and the voice server (151) for data communications. A data communications network for supporting multi-lingual user interaction with a multimodal application according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet™ Protocol or the Wireless Ethernet™ Protocol, a data communications network layer with the Internet Protocol ('IP'), a transport layer with the Transmission Control Protocol ('TCP') or the User Datagram Protocol ('UDP'), an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and other protocols as will occur to those of skill in the art.

The system of FIG. 1 also includes a web server (147) connected for data communications through wireline connection (123) to network (100) and therefore to the multimodal devices (152). The web server (147) may be any server that provides to client devices X+V markup documents (125) that compose multimodal applications. The web server (147) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. A multimodal application in a multimodal device then, upon receiving from the web sever (147) an X+V markup document as part of a multimodal application, may execute speech elements by use of a VoiceXML interpreter (192) and speech engine (153) in the multimodal device itself or by use of a VoiceXML interpreter (192) and speech engine (153) located remotely from the multimodal device in a voice server (151).

The arrangement of the multimodal devices (152), the web server (147), the voice server (151), and the data communications network (100) making up the exemplary system illustrated in FIG. 1 are for explanation, not for limitation. Data processing systems useful for supporting multi-lingual user interaction with a multimodal application according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Supporting multi-lingual user interaction with a multimodal application according to embodiments of the present invention in a thin client architecture may be implemented with one or more voice servers, computers, that is, automated computing machinery, that provide speech recognition and speech synthesis. For further explanation, therefore, FIG. 2 sets forth a block diagram of automated computing machinery comprising an example of a computer useful as a voice server (151) in supporting multi-lingual user interaction with a multimodal application according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server (151).

Stored in RAM (168) is a voice server application (188), a module of computer program instructions capable of operating a voice server in a system that is configured to order recognition results produced by an ASR engine for a multimodal application according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT applications, or Java Speech applications. Voice server application (188) may be implemented as a web server, implemented in Java, C++, or another language, that supports supporting multi-lingual user interaction with a multimodal application according embodiments of the present invention.

The voice server (151) in this example includes a plurality of speech engines (153). A speech engine is a functional module, typically a software module, although it may include specialized hardware also, that does the work of recognizing and synthesizing human speech. Each speech engine (153) includes an automated speech recognition ('ASR') engine (150) for speech recognition and a text-to-speech ('TTS') engine (194) for generating speech. Each TTS engine (194) is a module of computer program instructions that accepts text as input and returns the same text in the form of digitally encoded speech, for use in providing speech as prompts for and responses to users of multimodal systems. Each speech engine (153) also includes a grammar (104), a lexicon (106), and a language-specific acoustic model (108). The language-specific acoustic model (108) is a data structure, a table or database, for example, that associates Speech Feature Vectors with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine. Using a grammar, a lexicon, and an acoustic model tailored to a particular language or language dialect, each speech engine (153) is characterized by a language corresponding to one of the VoiceXML dialogs (121) processed by the VoiceXML interpreter (192).

The voice server application (188) in this example is configured to receive, from a multimodal client located remotely across a network from the voice server, digitized speech for recognition from a user and pass the speech along to the ASR engines (150) for recognition. The ASR engines (150) are modules of computer program instructions, also stored in RAM in this example. In carrying out supporting multi-lingual user interaction with a multimodal application, the ASR engines (150) receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engines can use the derived SFV to infer phonemes for the word from their respective language-specific acoustic models (108). The ASR engines then use the phonemes to find the word in their respective lexicons (106).

Figure 2:
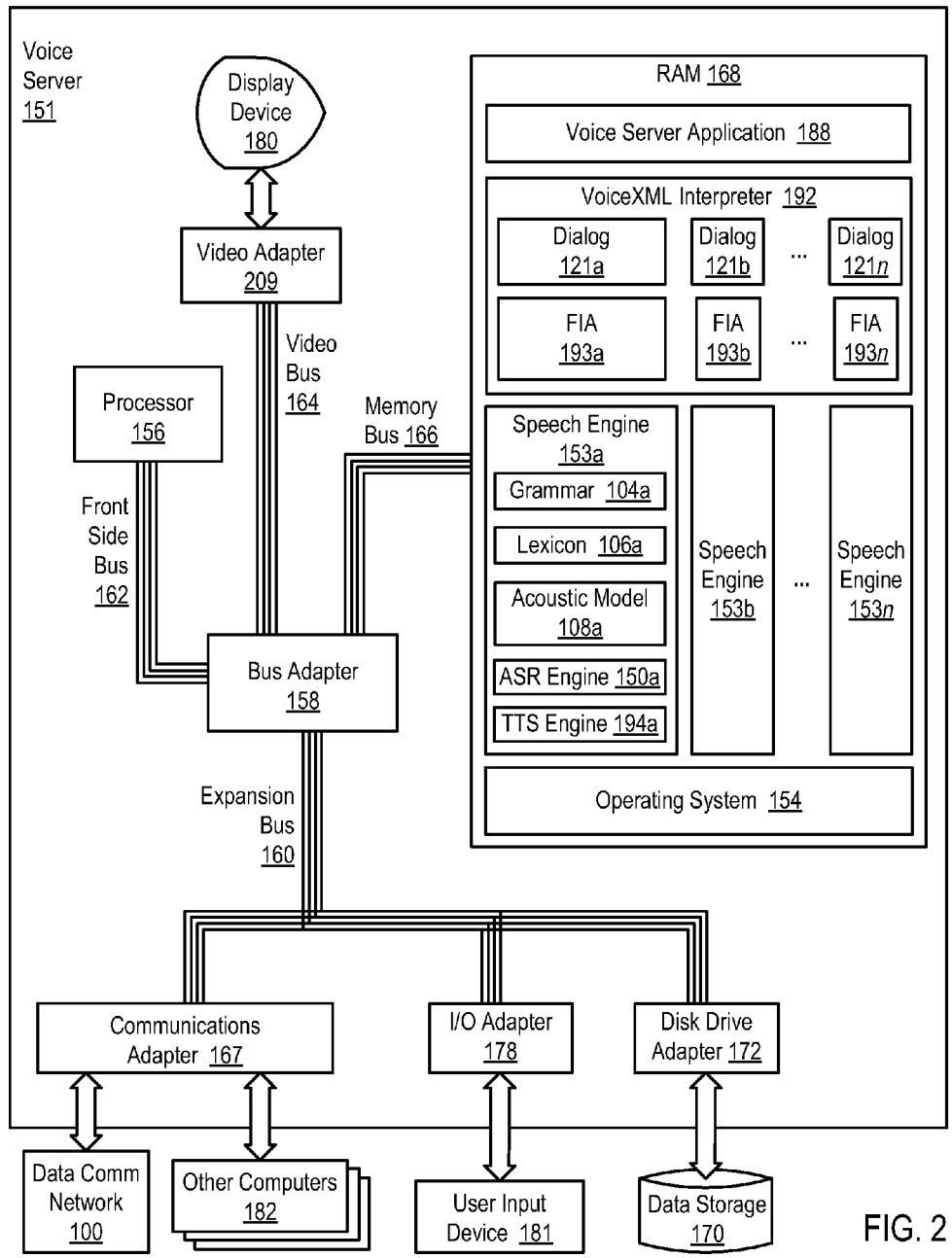
FIG. 2 sets forth a block diagram of automated computing machinery comprising an example of a computer useful as a voice server in supporting multi-lingual user interaction with a multimodal application according to embodiments of the present invention.

In the example of FIG. 2, the voice server application (188) passes the speech along to the ASR engines (150) for recognition through a VoiceXML interpreter (192). The VoiceXML interpreter (192) is a software module of computer program instructions that accepts VoiceXML dialogs (121) from a multimodal application running remotely on a multimodal device. The dialogs (121) include dialog instructions, typically implemented in the form of a VoiceXML <form> element. Each dialog (121) is characterized by a particular language such as French, American English, British English, German, and so on. Each voice dialog instructions include one or more grammars, data input elements, event handlers, and so on, that advise the VoiceXML interpreter (192) how to administer voice input from a user and voice prompts and responses to be presented to a user. The VoiceXML interpreter (192) administers such dialogs by processing the each VoiceXML dialog (121) in accordance with VoiceXML Form Interpretation Algorithms (193). In the example of FIG. 2, the VoiceXML interpreter (192) instantiates a separate FIA for each of the Voice XML dialogs (121) and processes each Voice XML dialog (121) characterized by a different language in parallel. The VoiceXML interpreter (192) then utilizes speech engines (153) to provide speech synthesis and recognition, where each speech engine (153) is characterized by a language corresponding to one of the VoiceXML dialogs (121).

The VoiceXML interpreter (192) of FIG. 2 is improved for supporting multi-lingual user interaction with a multimodal application according to embodiments of the present invention. The VoiceXML interpreter (192) may operate generally for supporting multi-lingual user interaction with a multimodal application according to embodiments of the present invention by: receiving, by the VoiceXML interpreter (192), a voice utterance from a user; determining in parallel, by the VoiceXML interpreter using the speech engines (153), recognition results for each VoiceXML dialog (121) in dependence upon the voice utterance and the grammar (104) for each speech engine (153); administering, by the VoiceXML interpreter (192), the recognition results for the VoiceXML dialogs (121); and selecting, by the VoiceXML interpreter (192), a language for user interaction in dependence upon the administered recognition results.

Also stored in RAM (168) is an operating system (154). Operating systems useful in voice servers according to embodiments of the present invention include UNIX™, Linux™, Microsoft NT™, IBM's AIX™, IBM's i5/OS™, and others as will occur to those of skill in the art. Operating system (154), voice server application (188), VoiceXML interpreter (192), speech engines (153), including ASR engines (150), and TTS engines (194) in the example of FIG. 2 are shown in RAM (168), but many components of such software typically are stored in non-volatile memory also, for example, on a disk drive (170).

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for supporting multi-lingual user interaction with a multimodal application according to embodiments of the present invention include modems for wired dial-up communications, Ethernet (IEEE 802.3) adapters for wired data communications network communications, and 802.11 adapters for wireless data communications network communications.

Figure 3:
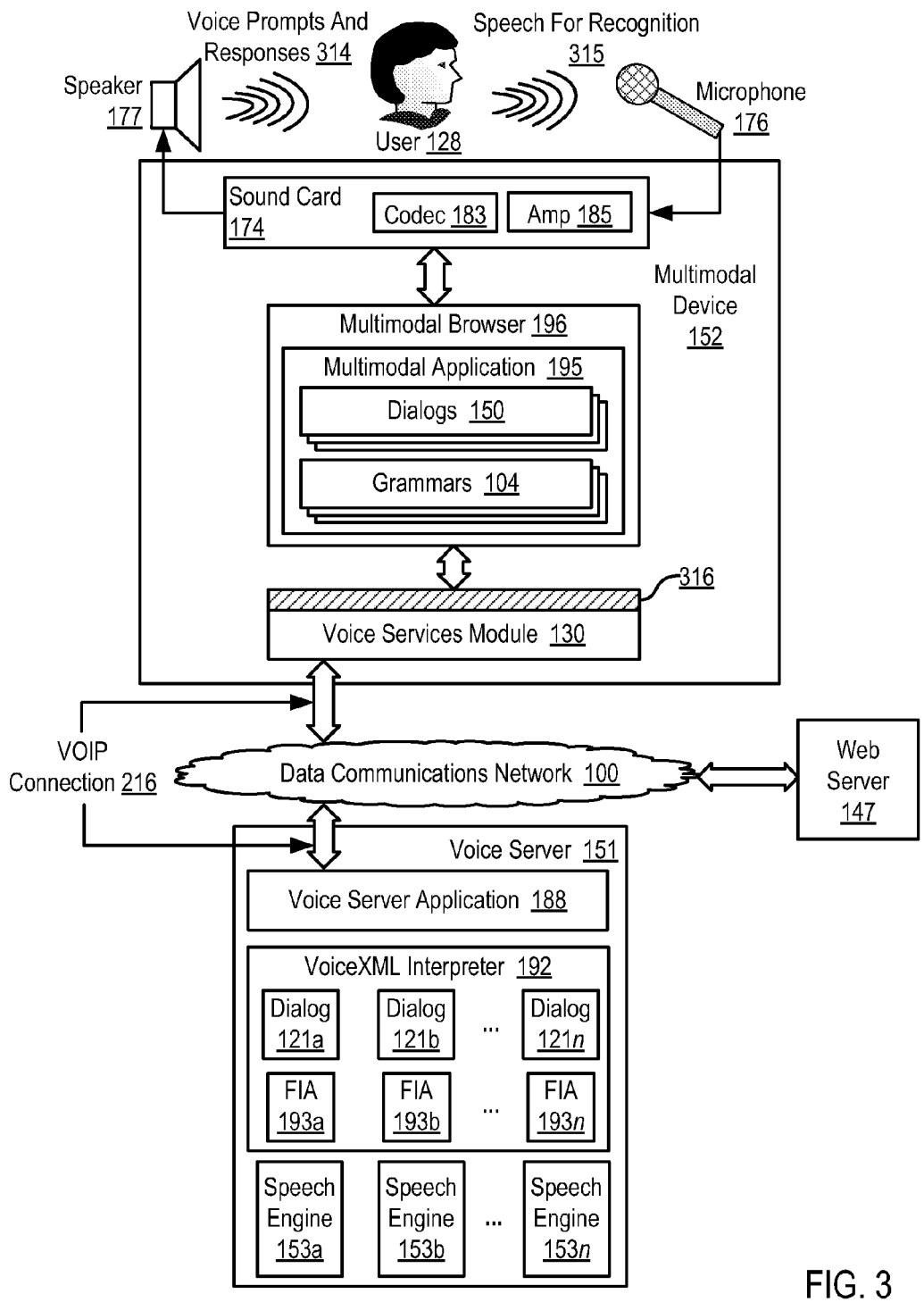
FIG. 3 sets forth a functional block diagram of exemplary apparatus for supporting multi-lingual user interaction with a multimodal application according to embodiments of the present invention.

For further explanation, FIG. 3 sets forth a functional block diagram of exemplary apparatus for supporting multi-lingual user interaction with a multimodal application in a thin client architecture according to embodiments of the present invention. The example of FIG. 3 includes a multimodal device (152) and a voice server (151) connected for data communication by a VOIP connection (216) through a data communications network (100). A multimodal application (195) operates in a multimodal browser (196) on the multimodal device (152), and a voice server application (188) operates on the voice server (151). The multimodal application (195) includes a plurality of VoiceXML dialogs (121), each VoiceXML dialog (121) characterized by a particular language. The multimodal application (195) also includes a plurality of grammars (104), each grammar characterized by a language corresponding to one of the dialogs (121). In the example of FIG. 3, the multimodal application (195) may be implemented as a set or sequence of one or more X+V pages that execute in the multimodal browser (196).

The multimodal device (152) supports multiple modes of interaction including a voice mode and one or more non-voice modes. The example multimodal device (152) of FIG. 3 also supports voice with a sound card (174), which is an example of an I/O adapter specially designed for accepting analog audio signals from a microphone (176) and converting the audio analog signals to digital form for further processing by a codec (183). The example multimodal device (152) of FIG. 3 may support non-voice modes of user interaction with keyboard input, mouseclicks, a graphical user interface ('GUI'), and so on, as will occur to those of skill in the art.

In addition to the multimodal sever application (188), the voice server (151) also has installed upon it a plurality of speech engine (153), each speech engine (153) having an ASR engine, a grammar, a lexicon, a language-specific acoustic model, and a TTS engine, as well as a Voice XML interpreter (192) that includes a form interpretation algorithm (193) for each dialog (121) received from the multimodal application (195). The VoiceXML interpreter (192) interprets and executes each VoiceXML dialog (121) received from the multimodal application (195) and provided to VoiceXML interpreter (192) through the voice server application (188). VoiceXML input to VoiceXML interpreter (192) may originate from the multimodal application (195) implemented as an X+V client running remotely in a multimodal browser (196) on the multimodal device (152). The VoiceXML interpreter (192) administers such dialogs by processing the dialogs (121) in accordance with VoiceXML Form Interpretation Algorithms (193). In the example of FIG. 3, the VoiceXML interpreter (192) instantiates a separate FIA for each of the Voice XML dialogs (121) and processes each Voice XML dialog (121) in parallel.

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operates in a manner that is similar to the operation of the system of FIG. 2 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal application (195), through the multimodal browser (196), an API (316), and a voice services module (130), then packages the digitized speech in a recognition request message according to a VOIP protocol, and transmits the speech to voice server (151) through the VOIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts—as well as voice prompts. Voice server application (188) includes computer program instructions that provide text-to-speech ('TTS') conversion for voice prompts and voice responses to user input in multimodal applications providing responses to HTTP requests from multimodal browsers running on multimodal devices.

The voice server application (188) receives speech for recognition from a user and passes the speech through API calls to VoiceXML interpreter (192) which in turn uses ASR engines in the speech engines (153) for speech recognition. An ASR engine receives digitized speech for recognition, uses frequency components of the digitized speech to derive an SFV, uses the SFV to infer phonemes for the word from a language-specific acoustic model, and uses the phonemes to find the speech in a lexicon specific to the particular speech engine (153). The ASR engine then compares speech found as words in the lexicon to words in one of the grammars (104) received from the multimodal application (195) to determine whether words or phrases in speech are recognized by the ASR engine.

The multimodal application (195) is operatively coupled to the speech engines (153) through the VoiceXML interpreter (192). In this example, the operative coupling to the speech engines (153) through a VoiceXML interpreter (192) is implemented with a VOIP connection (216) through a voice services module (130). The voice services module (130) is a thin layer of functionality, a module of computer program instructions, that presents an API (316) for use by an application level program in providing dialogs (121) and speech for recognition to a VoiceXML interpreter and receiving in response voice prompts and other responses, including action identifiers according to embodiments of the present invention. The VoiceXML interpreter (192), in turn, utilizes the speech engines (153) for speech recognition and generation services, each speech engine (153) having at least one of the grammars (104) and characterized by a language corresponding to one of the VoiceXML dialogs (121).

The VoiceXML interpreter (192) of FIG. 3 is improved for supporting multi-lingual user interaction with a multimodal application (195) according to embodiments of the present invention. The VoiceXML interpreter (192) may operate generally for supporting multi-lingual user interaction with a multimodal application (195) according to embodiments of the present invention by: receiving, by the VoiceXML interpreter (192), a voice utterance from a user (128); determining in parallel, by the VoiceXML interpreter (192) using the speech engines (153), recognition results (for each VoiceXML dialog (121) in dependence upon the voice utterance and the grammar (104) for each speech engine (153); administering, by the VoiceXML interpreter (192), the recognition results for the VoiceXML dialogs (121); and selecting, by the VoiceXML interpreter (192), a language for user interaction in dependence upon the administered recognition results.

In the example of FIG. 3, the voice services module (130) provides data communications services through the VOIP connection and the voice server application (188) between the multimodal device (152) and the VoiceXML interpreter (192). The API (316) is the same API presented to applications by a VoiceXML interpreter when the VoiceXML interpreter is installed on the multimodal device in a thick client architecture. So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal application (195).

Figure 4:
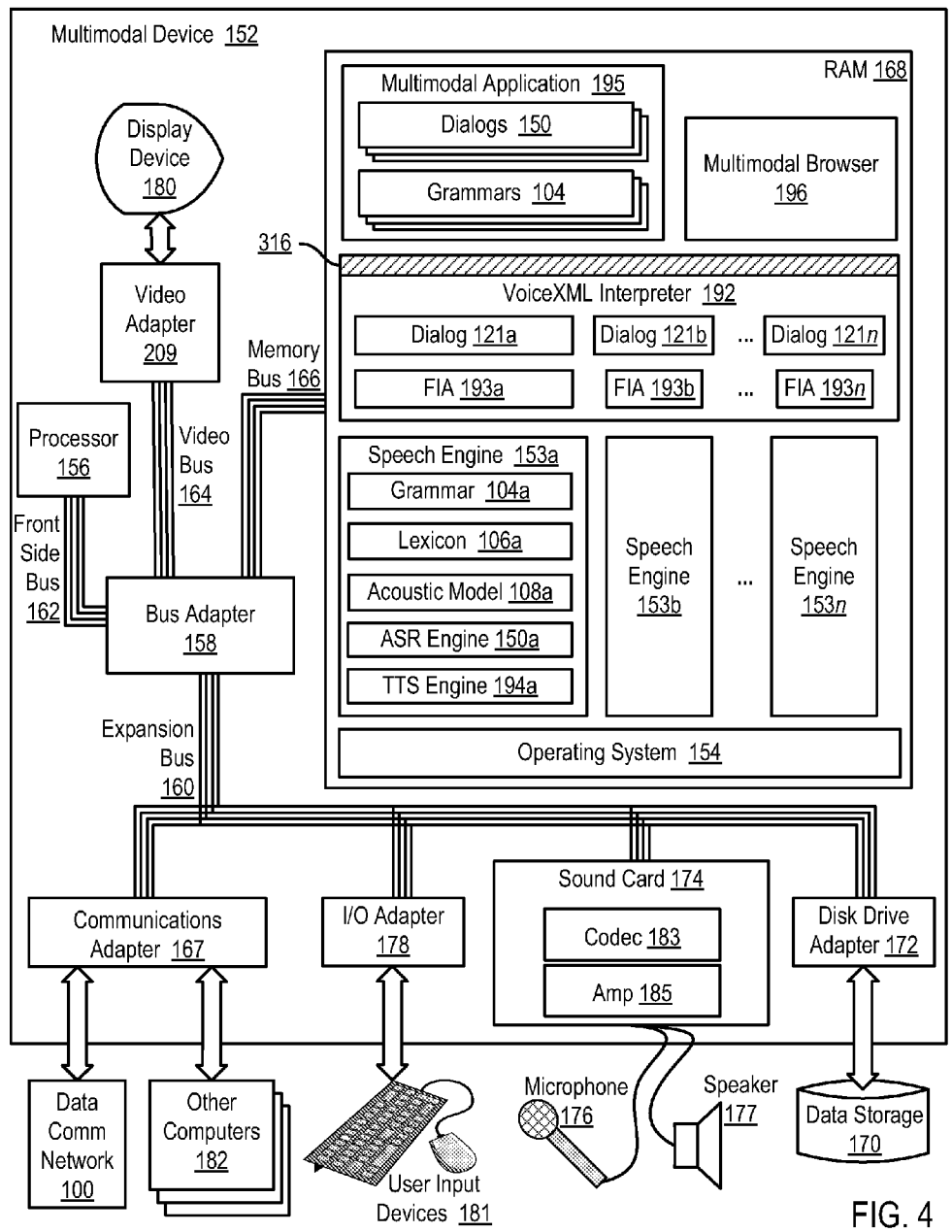
FIG. 4 sets forth a block diagram of automated computing machinery comprising an example of a computer useful as a multimodal device in supporting multi-lingual user interaction with a multimodal application according to embodiments of the present invention.

Supporting multi-lingual user interaction with a multimodal application according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) in supporting multi-lingual user interaction with a multimodal application according to embodiments of the present invention. In a multimodal device implementing a thick client architecture as illustrated in FIG. 4, the multimodal device (152) has no connection to a remote voice server containing a VoiceXML interpreter and a speech engine. Rather, all the components needed for speech synthesis and voice recognition in supporting multi-lingual user interaction with a multimodal application according to embodiments of the present invention are installed or embedded in the multimodal device itself.

The example multimodal device (152) of FIG. 4 includes several components that are structured and operate similarly as do parallel components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a VoiceXML Interpreter (192), speech engines (153), and so on. As in the system of FIG. 2, each speech engine (153) in the multimodal device of FIG. 4 includes an ASR engine (150), a grammar (104), a lexicon (106), a language-dependent acoustic model (108), and a TTS engine (194). The VoiceXML interpreter (192) administers dialogs (121) by processing the dialog instructions in accordance with VoiceXML Form Interpretation Algorithms (193). In the example of FIG. 4, the VoiceXML interpreter (192) instantiates a separate FIA for each of the Voice XML dialogs (121) and processes each Voice XML dialog (121) characterized by a particular language the in parallel.

The speech engine (153) in this kind of embodiment, a thick client architecture, often is implemented as an embedded module in a small form factor device such as a handheld device, a mobile phone, PDA, and the like. An example of an embedded speech engine useful for supporting multi-lingual user interaction with a multimodal application according to embodiments of the present invention is IBM's Embedded ViaVoice Enterprise. The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal application (195), a module of computer program instructions capable of operating a multimodal device as an apparatus that supports multi-lingual user interaction with a multimodal application according to embodiments of the present invention. The multimodal application (195) includes a plurality of VoiceXML dialogs (121), each VoiceXML dialog (121) characterized by a particular language. The multimodal application (195) also includes a plurality of grammars (104), each grammar (104) characterized by a language corresponding to a language used in one of the dialogs (121). The multimodal application (195) of FIG. 4 implements speech recognition by accepting speech utterances for recognition from a user and sending the utterance for recognition through VoiceXML interpreter API calls to the ASR engines (150). The multimodal application (195) implements speech synthesis generally by sending words to be used as prompts for a user to the TTS engines (194). As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, the multimodal application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engines (150). The multimodal application (195) may be implemented as a set or sequence of X+V pages (124) executing in a multimodal browser (196) or microbrowser that passes VoiceXML grammars and digitized speech by calls through a VoiceXML interpreter API directly to an embedded VoiceXML interpreter (192) for processing. The embedded VoiceXML interpreter (192) may in turn issue requests for speech recognition through API calls directly to the embedded ASR engines (150). Multimodal application (195) also can provide speech synthesis, TTS conversion, by API calls to the embedded TTS engines (194) for voice prompts and voice responses to user input.

The multimodal application (195) is operatively coupled to the speech engines (153) through a VoiceXML interpreter (192). In this example, the operative coupling through the VoiceXML interpreter is implemented using a VoiceXML interpreter API (316). The VoiceXML interpreter API (316) is a module of computer program instructions for use by an application level program in providing dialog instructions, speech for recognition, and other input to a VoiceXML interpreter and receiving in response voice prompts and other responses. The VoiceXML interpreter API presents the same application interface as is presented by the API of the voice service module (130 on FIG. 3) in a thin client architecture. At the application level, calls to the VoiceXML interpreter API may be issued from the multimodal browser (196), which provides an execution environment for the multimodal application (195) when the multimodal application is implemented with X+V. The VoiceXML interpreter (192), in turn, utilizes the speech engines (153) for speech recognition and generation services.

The VoiceXML interpreter (192) of FIG. 4 is improved for supporting multi-lingual user interaction with a multimodal application (195) according to embodiments of the present invention. The VoiceXML interpreter (192) may operate generally for supporting multi-lingual user interaction with a multimodal application (195) according to embodiments of the present invention by: receiving, by the VoiceXML interpreter (192), a voice utterance from a user (128); determining in parallel, by the VoiceXML interpreter (192) using the speech engines (153), recognition results (for each VoiceXML dialog (121) in dependence upon the voice utterance and the grammar (104) for each speech engine (153); administering, by the VoiceXML interpreter (192), the recognition results for the VoiceXML dialogs (121); and selecting, by the VoiceXML interpreter (192), a language for user interaction in dependence upon the administered recognition results.

The multimodal application (195) in this example, running in a multimodal browser (196) on a multimodal device (152) that contains its own VoiceXML interpreter (192) and its own speech engines (153) with no network or VOIP connection to a remote voice server containing a remote VoiceXML interpreter or a remote speech engine, is an example of a so-called 'thick client architecture,' so-called because all of the functionality for processing voice mode interactions between a user and the multimodal application—as well as all or most of the functionality for supporting multi-lingual user interaction with a multimodal application according to embodiments of the present invention—is implemented on the multimodal device itself.

Figure 5:
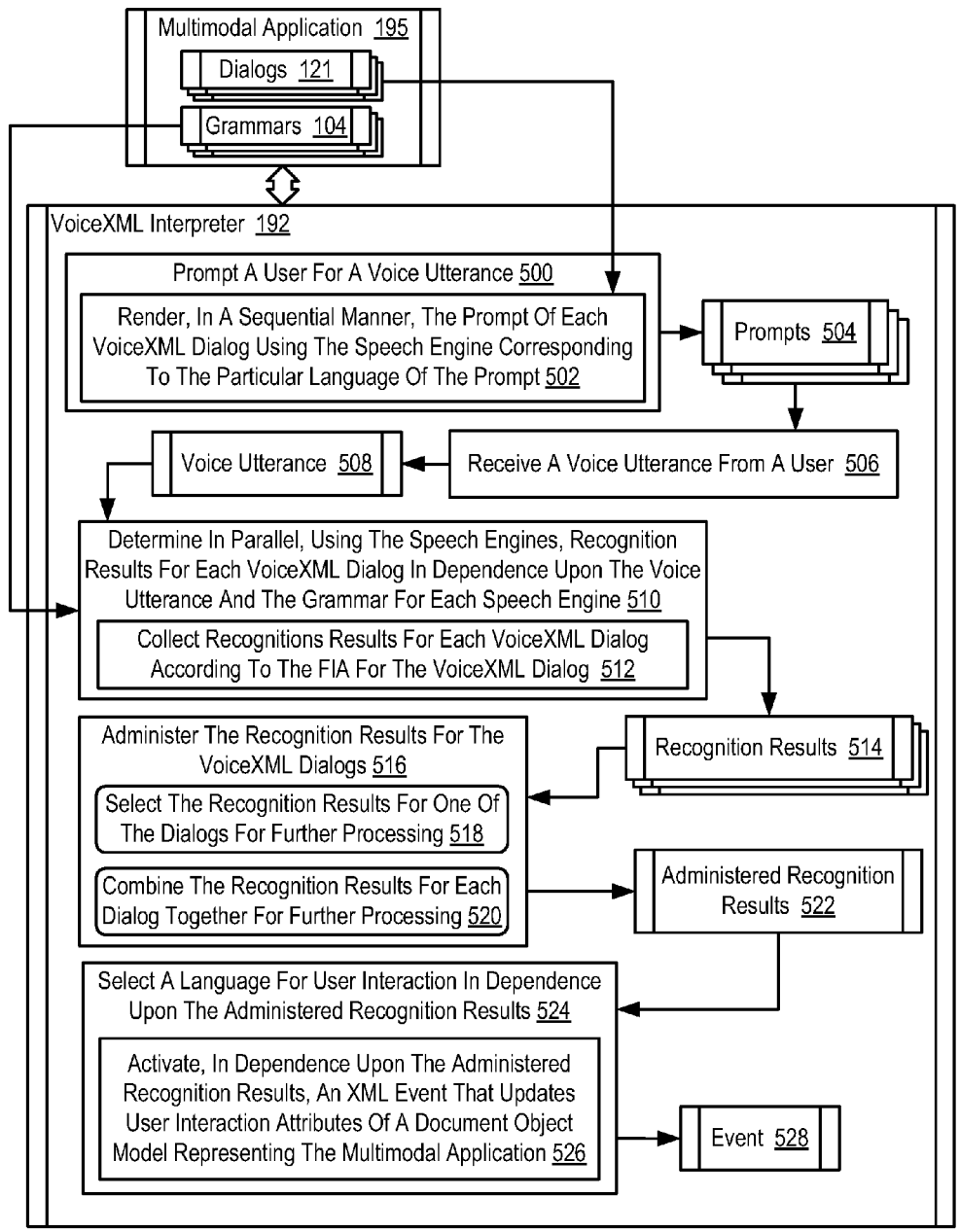
FIG. 5 sets forth a flow chart illustrating an exemplary method of supporting multi-lingual user interaction with a multimodal application according to embodiments of the present invention.

For further explanation, FIG. 5 sets forth a flow chart illustrating an exemplary method of supporting multi-lingual user interaction with a multimodal application (195) according to embodiments of the present invention. The multimodal application (195) includes a plurality of VoiceXML dialogs (121). A VoiceXML dialog is a set of instructions for presenting information to a user and collecting data from the user. In the example of FIG. 1, each VoiceXML dialog (121) is characterized by a particular language. For example, a first VoiceXML dialog may support user interaction in American English, a second VoiceXML dialog may support user interaction in British English, a third VoiceXML dialog may support user interaction in French, a fourth VoiceXML dialog may support user interaction in Spanish, and so on. In such a manner, each VoiceXML dialog (121) included in the multimodal application (195) may be tailored to a specific language or dialect of a language.

In the example of FIG. 5, the multimodal application (195) operates on a multimodal device supporting multiple modes of interaction including a voice mode and one or more non-voice modes of user interaction with the multimodal application (195). The voice mode may be implemented in this example with audio output through a speaker and audio input through a microphone. Non-voice modes may be implemented by user input devices such as, for example, a keyboard and a mouse.

The multimodal application is operatively coupled to a plurality of speech engines through a VoiceXML interpreter (192), each speech engine having a grammar (104) and characterized by a language corresponding to one of the VoiceXML dialogs (121). The operative coupling provides a data communications path from the multimodal application (195) to the speech engines for grammars (104), speech for recognition, and other input. The operative coupling also provides a data communications path from the speech engines to the multimodal application (195) for recognized speech, semantic interpretation results, and other results. The operative coupling may be effected with a VoiceXML interpreter (192 on FIG. 4) when the multimodal application is implemented in a thick client architecture. When the multimodal application is implemented in a thin client architecture, the operative coupling may include a voice services module (130 on FIG. 3), a VOIP connection (216 on FIG. 3), and a VoiceXML interpreter (192 on FIG. 3).

The method of FIG. 5 includes prompting (500), by the VoiceXML interpreter (192), a user for a voice utterance (508). In the example of FIG. 5, each VoiceXML dialog (121) specifies a prompt (504) in a particular language such as, for example, American English or French. The prompts (504) of FIG. 5 represent requests for user input that correspond to each dialog (121). A prompt (504) may be implemented using the VoiceXML <prompt> element within the VoiceXML <form> element implementing one of the dialogs (121). For example, consider the following exemplary segment of an exemplary multimodal application:

```
...
<vxml:form lang="en-us" id="kiosk-en">
    <vxml:field name="kiosk">
        <vxml:prompt>Do you want directions to a restaurant, theater,
            or museum?
        </vxml:prompt>
        ...
    </vxml:field>
</vxml:form>
<vxml:form lang="fr-fr" id="kiosk-fr">
    <vxml:field name="kiosk">
        <vxml:prompt>Voulez-vous trouver un restaurant, un théâtre, ou
            un musée?
        </vxml:prompt>
        ...
    </vxml:field>
</vxml:form>
...
```

The exemplary segment above includes two dialogs, the first dialog identified as 'kiosk-en' and the second dialog identified as 'kiosk-fr.' The first dialog is characterized by the English language and specifies a prompt in English as "Do you want directions to a restaurant, theater, or museum?" The second dialog is characterized by the French language and specifies the same prompt in French as "Voulez-vous trouver un restaurant, un théâtre, ou un musée?" Readers will note that the exemplary dialogs and exemplary prompts above are for explanation and not for limitation.

Prompting (500), by the VoiceXML interpreter (192), a user for a voice utterance (508) according to the method of FIG. 5 includes rendering (502), in a sequential manner, the prompt (504) of each VoiceXML dialog (121) using the speech engine corresponding to the particular language of the prompt (504). The VoiceXML interpreter (192) may render (502) the prompt (504) of each VoiceXML dialog (121) using speech engine according to the method of FIG. 5 by instantiating a Form Interpretation Algorithm ('FIA') for each dialog (121) and processing each dialog (121) in parallel. Each FIA processes a dialog using its own speech engine to queue speech synthesis and audio output to the user in the language corresponding to the language of the dialog assigned to the FIA. Upon queuing the speech synthesis and audio output, each FIA may notify the VoiceXML interpreter (192) that its prompt has been synthesized and is ready for playback to the user. The VoiceXML interpreter (192) may then render (502) the prompt (504) of each VoiceXML dialog (121) in a sequential manner according to the method of FIG. 5 by notifying each FIA to play the synthesized version of its prompt (504) one at a time in serial manner, the VoiceXML interpreter (192) waiting for one FIA to complete playback before allowing the next FIA to playback its prompt (504). The FIAs of the VoiceXML interpreter (192) may playback their synthesized versions of the prompt (504) through the audio system of the multimodal device on which the multimodal application (195) operates.

As mentioned above, the VoiceXML interpreter (192) instantiates a Form Interpretation Algorithm for each dialog (121) and processing each dialog (121) in parallel. The multimodal application may instruct the VoiceXML interpreter (192) to process each dialog (121) in parallel using XML Event listeners. XML Event listeners map the occurrence of defined events to particular actions to be performed when the defined event occurs. XML Event listeners are described in detail in the XML Events specifications promulgated by the W3C organization. For an example of XML Event listeners useful in instructing the VoiceXML interpreter (192) to process each dialog (121) in parallel, consider again the exemplary multimodal application above. The following segment of the exemplary multimodal application illustrates XML Event listeners:

```
...
    <ev:listener event="load" observer="body" handler="#kiosk-en"
        defaultAction="cancel"/>
    <ev:listener event="load" observer="body" handler="#kiosk-fr"
        defaultAction="cancel"/>
</head>
<body id="body">
    ...
</body>
</html>
...
```

The exemplary segment above includes two XML Event listeners. Each event listener listens for a 'load' event of the <body> element in the multimodal application. The first event listener specifies processing the 'kiosk-en' dialog illustrated above when the <body> element is loaded. The second event listener specifies processing the 'kiosk-fr' dialog illustrated above when the <body> element is loaded. In this manner, when the <body> element is loaded, the VoiceXML interpreter (192) processes both the 'kiosk-en' dialog and the 'kiosk-fr' dialog. As mentioned above, the VoiceXML interpreter (192) processes each dialog in a separate form interpretation algorithm.

The method of FIG. 5 also includes receiving (506), by the VoiceXML interpreter (192), a voice utterance (508) from a user. The voice utterance (508) of FIG. 5 represents digitized human speech provided to the multimodal application (195) by a user of a multimodal device. As mentioned above, the multimodal application (195) may acquire the voice utterance (508) from a user through a microphone and encode the voice utterance in a suitable format for storage and transmission using any CODEC as will occur to those of skill in the art. In a thin client architecture, the VoiceXML interpreter (192) may receive (506) the voice utterance (508) according to the method of FIG. 5 as part of a call by the multimodal application (195) to a voice services module (130 on FIG. 3) to provide voice recognition services. The voice services module, then in turn, passes the voice utterance (508) to the VoiceXML interpreter (192) through a VOIP connection (216 on FIG. 3) and a voice server application (188 on FIG. 3). In a thick client architecture, the VoiceXML interpreter (192) may receive (506) the voice utterance (508) from the multimodal application (195) according to the method of FIG. 5 as part of a call directly to an embedded VoiceXML interpreter (192) by the multimodal application (195) through an API exposed by the VoiceXML interpreter (192).

Supporting multi-lingual user interaction with a multimodal application (124) according to the method of FIG. 5 is implemented with the grammars (104) of the multimodal application (195) in speech engines. Through the operative coupling between the multimodal application (195) and the speech engines, the multimodal application (195) may provide the grammars (104) to the various speech engines. The multimodal application (195) may specify the grammars (104) using the VoiceXML <grammar> element as follows:

<grammar src="grammar.1e"/>

The source attribute 'src' specifics the URI of the definition of the exemplary grammar. Although the above example illustrates how a grammar may be referenced externally, a grammar's definition may also be expressed in-line in a multimodal application. Consider again, the exemplary multimodal applications above. The following segment of the exemplary multimodal application illustrates grammars expressed in-line in each dialogue:

```
...
<vxml:form lang="en-us" id="kiosk-en">
    <vxml:field name="kiosk">
        <vxml:prompt>Do you want directions to a restaurant, theater,
            or museum?</vxml:prompt>
        <vxml:grammar><![CDATA[
            #JSGF V1.0;
            grammar <directions>;
            public <directions> = [Show] [me] restaurants | theaters
                | museums;]]>
        </vxml:grammar>
        ...
    </vxml:field>
</vxml:form>
<vxml:form lang="fr-fr" id="kiosk-fr">
    <vxml:field name="kiosk">
```

```
        <vxml:prompt>Voulez-vous trouver un restaurant, un théâtre, ou
            un musée?</vxml:prompt>
        <vxml:grammar><![CDATA[
            #JSGF V1.0;
            grammar <directions>;
            public <directions> = [montrez-moi] [les] restaurants |
                théâtres | musées {$="museum"}; ]]>
        </vxml:grammar>
        ...
    </vxml:field>
</vxml:form>
...
```

Each dialog of in the exemplary multimodal application segment above defines a grammar useful in recognizing responses to the prompt in each dialog. The grammar for the first dialog allows for recognition of English phrases such as: 'Show me restaurants,' 'theaters,' 'Show museums,' and so on. The grammar for the second dialog allows for recognition of French phrases such as: 'montrez-moi les restaurants,' 'théâtres,' 'montrez-moi musées,' and so on. The VoiceXML interpreter (192) provides the grammar in each dialog to a speech engine capable of recognizing the speech in the language corresponding to the grammar.

The method of FIG. 5 includes determining (510) in parallel, by the VoiceXML interpreter (192) using the speech engines, recognition results (514) for each VoiceXML dialog (121) in dependence upon the voice utterance (508) and the grammar (104) for each speech engine. The recognition results (514) of FIG. 5 represent the results returned to the VoiceXML interpreter (192) from each of the speech engines used to support multi-lingual user interaction according to embodiments of the present invention. As mentioned above, each VoiceXML dialog (121) is processed by the VoiceXML interpreter (192) according to a Form Interpretation Algorithm for the VoiceXML dialog (121). The VoiceXML interpreter (192) may determine (510) recognition results (514) according to the method of FIG. 5 by collecting (512) recognitions results (514) for each VoiceXML dialog (121) according to the FIA for the VoiceXML dialog (121). The VoiceXML interpreter (192) may collect (512) the recognitions results (514) for each VoiceXML dialog (121) according to the FIA for the VoiceXML dialog (121) by instructing each FIA to pass the voice utterance (508) and the grammar (104) for the FIA to the speech engine utilized by the FIA for speech recognition, and to receive recognition results (514) from the speech engine. In such a manner, the VoiceXML interpreter (192) collects recognition results (514) in parallel from each speech engine using the same voice utterance (508).

The method of FIG. 5 also includes administering (516), by the VoiceXML interpreter (192), the recognition results (514) for the VoiceXML dialogs (121). In the method of FIG. 5, the VoiceXML interpreter (192) administer (516) the recognition results (514) for the VoiceXML dialogs (121) by selecting (518) the recognition results (514) for one of the VoiceXML dialogs (121) for further processing or combining (520) the recognition results (514) for each VoiceXML dialog (121) together for further processing. The VoiceXML interpreter (192) may select (518) the recognition results (514) for only one of the VoiceXML dialogs (121) for further processing because only the recognition results (514) characterized by a language that matches the language spoken by the user in the voice utterance (508) may be useful to the multimodal application (195). For example, if the user provides a voice utterance in English, the recognition results returned by a French speech engine or a Spanish speech engine may not be useful to the multimodal application—rather the recognition results returned by an English speech engine are useful.

The VoiceXML interpreter (192) may select (518) the recognition results (514) for one of the VoiceXML dialogs (121) for further processing according to the method of FIG. 5 by selecting the recognition results (514) for the VoiceXML dialogs (121) characterized by the same language as the voice utterance (508). The VoiceXML interpreter (192) may select the recognition results (514) for the VoiceXML dialogs (121) characterized by the same language as the voice utterance (508) by storing the recognition results having the highest speech engine confidence level in an ECMAScript data structure such as, for example, the application variable array 'application.lastresult$' or some other field variable array for a field specified by the multimodal application. The recognition results (514) having the highest speech engine confidence level may be identified as the administered recognition results (522). The confidence level is assigned to the recognition results by a speech engine and specifies how confident the speech engine is that each result matches the voice utterance. Using the confidence level allows the VoiceXML interpreter (192) to select the recognition results (514) for the VoiceXML dialogs (121) characterized by the same language as the voice utterance (508) because the recognition results (514) for the VoiceXML dialogs (121) characterized by the same language as the voice utterance (508) typically have the highest confidence levels.

In addition to using confidence levels, the VoiceXML interpreter (192) may select the recognition results (514) for the VoiceXML dialogs (121) characterized by the same language as the voice utterance (508) using 'match' and 'no match' events from the speech engine. A 'match' event indicates that a particular speech engine was able to find a match using the voice utterance, while a 'no match' event indicates that a particular speech engine was not able to find a match using the voice utterance. The recognition results (514) from the speech engine raises a 'match' event may be identified as the administered recognition results (522). Typically, a speech engine will not typically be able to find a match, and thus recognition results, if the speech engine is not configured to recognize speech of the same language as the voice utterance (508). In contrast, however, speech engine will typically be able to find a match, and thus recognition results, if the speech engine is configured to recognize speech of the same language as the voice utterance (508).

As mentioned above, the VoiceXML interpreter (192) of FIG. 5 may store the recognition results (514) in an ECMAScript data structure such as, for example, the 'application.lastresult$' array. ECMAScript data structures represent objects in the Document Object Model ('DOM') at the scripting level in a page of a multimodal application such as, for example, an X+V page. The DOM is created by a multimodal browser when the X+V page of the multimodal application is loaded. The 'application.lastresult$' array holds information about the last recognition generated by a speech engine for the multimodal application (195). The 'application.lastresult$' is an array of elements where each element, application.lastresult$[i], represents a possible result through the following shadow variables:

application.lastresult$[i].confidence, which specifies the confidence level for this recognition result. A value of 0.0 indicates minimum confidence, and a value of 1.0 indicates maximum confidence.

application.lastresult$[i].utterance, which is the raw string of words that compose this recognition result. The exact tokenization and spelling is platform-specific (e.g. "five hundred thirty" or "5 hundred 30" or even "530").

application.lastresult$[i].inputmode, which specifies the mode in which the user provided the voice utterance. Typically, the value is voice for a voice utterance.

application.lastresult$[i].interpretation, which is an ECMAScript variable containing output from ECMAScript post-processing script typically used to reformat the value contained in the 'utterance' shadow variable.

When the VoiceXML interpreter (192) stores the recognition results in an ECMAScript field variable array for a field specified in the multimodal application (195), the recognition results (514) may be stored in field variable array using shadow variables similar to the application variable 'application.lastresult$.' For example, a field variable array may represent a possible recognition result through the following shadow variables:

name$[i].confidence,
name$[i].utterance,
name$[i].inputmode, and
name$[i].interpretation, where 'name$' is a placeholder for the field identifier for a field in the multimodal application (195) specified to store the results of the recognition results (506). Using either the application variable 'application.lastresult$' or some other field variable as mentioned above, the VoiceXML interpreter (192) may select the recognition results returned by one of the speech engines for one of the dialogs to provide the multimodal application with access to the recognition results characterized by the same language as the voice utterance.

As mentioned above, the VoiceXML interpreter (192) may administer (516) the recognition results (514) for the VoiceXML dialogs (121) according to the method of FIG. 5 by combining (520) the recognition results (514) for each VoiceXML dialog (121) together for further processing. The VoiceXML interpreter (192) may combine (520) the recognition results (514) for each VoiceXML dialog (121) together for further processing according to the method of FIG. 5 by storing all the recognition results in an ECMAScript data structures such as, for example, the application variable array 'application.lastresult$' or some other field variable array for a field specified by the multimodal application, along with an language identifier indicating which language of a particular recognition result. The ECMAScript data structure with the language identifier may be identified as the administered recognition results (522). The language identifier may be implemented as a value in a shadow variable for the application variable array 'application.lastresult$' or some other field variable array for a field. Consider, for example, the following shadow variable for storing a language identifier along with the recognition results:

application. lastresult$.lang

In the example above, the shadow variable 'lang' stores a language identifier such as, for example, 'American English,' 'French,' 'Spanish,' 'German,' and so on. Using the shadow variable 'lang,' the VoiceXML interpreter (192) may store all the recognition results for each speech engine and dialog (121) along with a language identifier indicating which language characterizes a particular recognition result (514). Using either the shadow variable 'lang,' the VoiceXML interpreter (192) may combine the recognition results for each VoiceXML dialog (121) together to provide the multimodal application with access to all the recognition results regardless of the language of the recognition results. All the administered recognition results (522) represented in the 'application.lastresult$' array may be ordered first by the language identifier and then ordered second by the confidence level. Readers will note, however, that such ordering is for explanation and not for limitation.

The method of FIG. 5 includes selecting (524), by the VoiceXML interpreter (192), a language for user interaction in dependence upon the administered recognition results (522). The VoiceXML interpreter (192) may select (524) a language for user interaction according to the method of FIG. 5 by activating (526), in dependence upon the administered recognition results (522), an XML event (528) that updates user interaction attributes of a Document Object Model representing the multimodal application (195). The event (528) represents an XML event that is activated by the VoiceXML interpreter (192) using the administered recognition results (522). For further explanation, consider again the exemplary multimodal application already described above:

```
...
<vxml:form lang="en-us" id="kiosk-en">
    <vxml:field name="kiosk">
        <vxml:prompt>Do you want directions to a restaurant, theater,
            or museum?</vxml:prompt>
        <vxml:grammar><![CDATA[
            #JSGF V1.0;
            grammar <directions>;
            public <directions> = [Show] [me] restaurants | theaters
                | museums;]]>
        </vxml:grammar>
        <vxml:filled>
            <vxml:throw event="answer.en-us"/>
        </vxml:filled>
    </vxml:field>
</vxml:form>
<vxml:form lang="fr-fr" id="kiosk-fr">
    <vxml:field name="kiosk">
        <vxml:prompt>Voulez-vous trouver un restaurant, un théâtre, ou
            un musée?</vxml:prompt>
        <vxml:grammar><![CDATA[
            #JSGF V1.0;
            grammar <directions>;
            public <directions> = [montrez-moi] [les] restaurants |
                théâtres | musées {$="museum"}; ]]>
        </vxml:grammar>
        <vxml:filled>
            <vxml:throw event="answer.fr-fr"/>
        </vxml:filled>
    </vxml:field>
</vxml:form>
...
<script type="text/javascript" declare="declare" ev:event="answer.en-us"
    ev:observer="body">
    display-lang("en-us", true);
    display-lang("fr-fr", false);
</script>
<script type="text/javascript" declare="declare" ev:event="answer.fr-fr"
    ev:observer="body">
    display-lang("en-us", false);
    display-lang("fr-fr", true);
</script>
...
```

The exemplary multimodal application segment includes two XML events that may be activated by the VoiceXML interpreter (192)—the 'answer.en-us' event and the 'answer.fr-fr' event. The 'answer.en-us' event is an XML event that is activated when the VoiceXML interpreter (192) obtains administered recognition results (514) for the 'kiosk-en' dialog. The 'answer.fr-fr' event is an XML event that is activated when the VoiceXML interpreter (192) obtains administered recognition results (514) for the 'kiosk-fr' dialog.

To further understand how the VoiceXML interpreter (192) activates an XML event (528), readers will note that each exemplary event, 'answer.en-us' and 'answer.fr-fr,' are contained in the VoiceXML <filled> elements, which are in turn contained in VoiceXML <field> elements. Each of the exemplary <filled> elements above is only executed by the VoiceXML interpreter (192) when the VoiceXML interpreter (192) is able to fill the field specified by the parent <field> element with a value. For example, the VoiceXML interpreter (192) will execute the '<vxml:throw event="answer.en-us"/>' action to activate the 'answer.en-us' event when the field 'kiosk' of the 'kiosk-en' dialog is filled with a value from the recognition result 'application.lastresult$.' The VoiceXML interpreter (192), however, may only fill the 'kiosk' field of the 'kiosk-en' dialog with a value from the recognition result 'application.lastresult$' when the VoiceXML interpreter (192) selects the recognition results for the 'kiosk-en' dialog for further processing. Similarly, the VoiceXML interpreter (192) will execute the '<vxml:throw event="answer.fr-fr"/>' action to activate the 'answer.fr-fr' event when the field 'kiosk' of the 'kiosk-fr' dialog is filled with a value from the recognition result 'application.lastresult$.' The VoiceXML interpreter (192), however, may only fill the 'kiosk' field of the 'kiosk-fr' dialog with a value from the recognition result 'application.lastresult$' when the VoiceXML interpreter (192) selects the recognition results for the 'kiosk-fr' dialog for further processing. If the VoiceXML interpreter (192) combines all the recognition results for 'kiosk-en' and 'kiosk-fr' dialogs together, then the VoiceXML interpreter (192) may rely on addition scripting logic in the <filled> elements to select a language for user interaction using the confidence levels of the recognition results.

When the VoiceXML interpreter (192) activates (526) an XML event (528) in the exemplary multimodal application segment above, either the 'answer.en-us' event or the 'answer.fr-fr' event is activated. These events provide the author of a multimodal application with ability to change the behavior of the multimodal application depending on the language selected for user interaction. The author is afforded this ability because each event updates user interaction attributes of the DOM representing the multimodal application (195). For example, in the exemplary multimodal application described above, visual elements are tagged with Cascading Style Sheet ('CSS') class name attributes indicating each visual elements language. Consider the following segment of the exemplary multimodal application:

```
...
</head>
<body id="body">
    <h2 class="en-us">What do you want to find in the city?</h2>
    <h2 class="fr-fr">Que voulez-vous trouver dans la ville ?</h2>
    <form name="fid" action="mm20.xhtml">
        <input type="text" id="in1" />
    </form>
</body>
</html>
...
```

The exemplary segment above includes two visual elements implemented with the <h2> tag. The first <h2> element is tagged with a CSS class name attribute having a value of 'en-us.' The second <h2> element is tagged with a CSS class name attribute having a value of 'en-fr.'

Activating either the 'answer.en-us' event or the 'answer.fr-fr' event toggles the visual display of the exemplary <h2> visual elements above by updating user interaction attributes of the DOM representing <h2> visual elements of the multimodal application (195). For example, activing the 'answer.en-us' event instructs the VoiceXML interpreter (192) to execute an exemplary ECMAScript script containing the following instructions:

```
display-lang("en-us", true);
display-lang("fr-fr", false);
``` which update the DOM representing the multimodal application (195) to indicate that the visual elements having a class name attribute value of 'en-us' are displayed and that the visual elements having a class name attribute value of 'fr-fr' are hidden. Similarly, activing the 'answer.fr-fr' event instructs the VoiceXML interpreter (192) to execute an exemplary ECMAScript script containing the following instructions:

```
display-lang("en-us", true);
display-lang("fr-fr", false);
``` which update the DOM representing the multimodal application (195) to indicate that the visual elements having a class name attribute value of 'fr-fr' are displayed and that the visual elements having a class name attribute value of 'en-us' are hidden.

Definitions of the exemplary 'display-lang' function that specify instructions for updating user interaction attributes of a Document Object Model representing the multimodal application (195) may include the following exemplary definition:

```
...
<script>
    function display-lang(lang, on)
    {
        var display = "";
        if (on)
            display = "inline";
        else
            display = "none";
        for (i in document.all)
        {
            if (document.all[i].className == lang)
                document.all[i].style.display = display;
        }
    }
</script>
...
```

The exemplary definition for the exemplary 'display-lang' function above provides instructions to traverse each element of the DOM for a page of a multimodal application and set the display style attribute either 'inline' or 'none' based on the values of the 'lang' parameter and the 'on' parameter. Readers will note that such an exemplary definition is for explanation and not for limitation. The exemplary 'display-lang' function above provides the VoiceXML Interpreter (192) with the ability to active an XML event (528) that updates user interaction attributes of a DOM representing the multimodal application (195), and thereby selects a language for user interaction.

Exemplary embodiments of the present invention are described largely in the context of a fully functional computer system for supporting multi-lingual user interaction with a multimodal application. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
receiving a voice utterance from a user;
determining, using at least one speech engine operating on at least one processor and a plurality of grammars that each specifies a limited set of one or more acceptable inputs in a language of a plurality of languages, a plurality of speech recognition results for the voice utterance and a plurality of confidence levels, the at least one speech engine determining each of the plurality of speech recognition results by using at least one of the plurality of grammars and matching the voice utterance to the limited set of acceptable inputs identified by the at least one grammar of the plurality of grammars, each confidence level of the plurality of confidence levels corresponding to a respective speech recognition result of the plurality of speech recognition results and each of the plurality of speech recognition results corresponding to a respective language of the plurality of languages, wherein each of the plurality of confidence levels determined using the at least one speech engine indicates a confidence of the at least one speech engine that the voice utterance matches a matched input of the limited set of acceptable inputs identified by the at least one grammar used to determine the speech recognition result;
evaluating the plurality of confidence levels for the plurality of speech recognition results to determine a speech recognition result of the plurality of speech recognition results having a highest confidence level of the plurality of confidence levels determined by the at least one speech engine; and
selecting one of the plurality of languages for use in subsequently interacting with the user by selecting a language corresponding to the speech recognition result having the highest confidence level of the plurality of confidence levels determined by the at least one speech engine.

2. The method of claim 1, further comprising:
prompting the user for the voice utterance.

3. The method of claim 2, wherein prompting the user for the voice utterance further comprises rendering, in a sequential manner, a prompt in each of the plurality of languages.

4. The method of claim 1, wherein:
an application having a voice interface uses a plurality of dialogs to interact with the user, each dialog being arranged to cause the application to interact with the user in a particular one of the plurality of languages;
each grammar of the plurality of grammars corresponds to one of the plurality of dialogs and the particular language of the corresponding dialog;
receiving the voice utterance comprises processing the voice utterance for each dialog using a Form Interpretation Algorithm ('FIA') corresponding to the dialog; and
determining speech recognition results further comprises collecting speech recognition results, using the plurality of grammars, for each dialog according to the FIA corresponding to each dialog.

5. The method of claim 4, wherein further comprising:
configuring the application to interact with the user in the language corresponding to the speech recognition result corresponding to the highest confidence value, wherein the configuring comprises activating an event that updates user interaction attributes of a Document Object Model representing the application.

6. The method of claim 1, wherein determining the speech recognition results using the at least one speech engine comprises determining the speech recognition results using, in parallel, a plurality of speech engines.

7. The method of claim 1, wherein each language of the plurality of languages is associated with a different speech engine of a plurality of speech engines, and
wherein determining the plurality of speech recognition results comprises determining the plurality of speech recognition results by respectively using the plurality of speech engines.

8. The method of claim 1, further comprising:
interacting with the user in the language corresponding to the speech recognition result corresponding to the highest confidence value of the plurality of confidence levels determined using the at least one speech engine.

9. An apparatus comprising:
at least one computer processor programmed to:
receive a voice utterance from a user;
determine, using at least one speech engine and a plurality of grammars that each specifies a limited set of one or more acceptable inputs in a language of a plurality of languages, a plurality of speech recognition results for the voice utterance and a plurality of confidence levels, the at least one speech engine determining each of the plurality of speech recognition results by using at least one of the plurality of grammars and matching the voice utterance to the limited set of acceptable inputs identified by the at least one grammar of the plurality of grammars, each confidence level of the plurality of confidence levels corresponding to a respective speech recognition result of the plurality of speech recognition results and each of the plurality of speech recognition results corresponding to a respective language of the plurality of languages, wherein each of the plurality of confidence levels determined using the at least one speech engine indicates a confidence of the at least one speech engine that the voice utterance matches a matched input of the limited set of acceptable inputs identified by the at least one grammar used to determine the speech recognition result;
evaluate the plurality of confidence levels for the plurality of speech recognition results to determine a speech recognition result of the plurality of speech recognition results having a highest confidence level of the plurality of confidence levels determined by the at least one speech engine; and
select one of the plurality of languages for use in subsequently interacting with the user by selecting a language corresponding to the speech recognition result having the highest confidence level of the plurality of confidence levels determined by the at least one speech engine.

10. The apparatus of claim 9, wherein:
an application having a voice interface is configured to provide a prompt to the user in each language of the plurality of languages, and
the at least one processor is further programmed to prompt the user for the voice utterance, the prompting including rendering, in a sequential manner, the prompt of each language.

11. The apparatus of claim 9, wherein:
an application having a voice interface uses a plurality of dialogs to interact with the user, each dialog being arranged to cause the application to interact with the user in a particular one of the plurality of languages;
each grammar of the plurality of grammars corresponds to one of the plurality of dialogs and the particular language of the corresponding dialog;
the at least one processor is programmed to receive the voice utterance by processing the voice utterance for each dialog using a Form Interpretation Algorithm ('FIA') for the dialog; and
the at least one processor is programmed to determine the speech recognition results using the plurality of grammars by collecting recognitions results for each dialog according to the FIA corresponding to each dialog.

12. The apparatus of claim 11, wherein the at least one processor is programmed to select the language for user interaction at least in part by configuring the application to interact with the user in the language, wherein the configuring comprises activating an event that updates user interaction attributes of a Document Object Model representing the application.

13. The apparatus of claim 9, wherein the at least one processor is programmed to determine the speech recognition results using the at least one speech engine at least in part by determining the speech recognition results using, in parallel, a plurality of speech engines.

14. The apparatus of claim 9, wherein each language of the plurality of languages is associated with a different speech engine of a plurality of speech engines, and
wherein the at least one processor is programmed to determine the plurality of speech recognition results at least in part by determining the plurality of speech recognition results respectively using the plurality of speech engines.

15. At least one non-transitory recordable medium encoded with computer-executable instructions that, when executed by a computer, cause the computer to carry out a method comprising:
receiving a voice utterance from a user;
determining, using at least one speech engine and a plurality of grammars that each specifies a limited set of one or more acceptable inputs in a language of a plurality of languages, a plurality of speech recognition results for the voice utterance and a plurality of confidence levels, the at least one speech engine determining each of the plurality of speech recognition results by using at least one of the plurality of grammars and matching the voice utterance to the limited set of acceptable inputs identified by the at least one grammar of the plurality of grammars, each confidence level of the plurality of confidence levels corresponding to a respective speech recognition result of the plurality of speech recognition results and each of the plurality of speech recognition results corresponding to a respective language of the plurality of languages, wherein each of the plurality of confidence levels determined using the at least one speech engine indicates a confidence of the at least one speech engine that the voice utterance matches a matched input of the limited set of acceptable inputs identified by the at least one grammar used to determine the speech recognition result;

evaluating the plurality of confidence levels for the plurality of speech recognition results to determine a speech recognition result of the plurality of speech recognition results having a highest confidence level of the plurality of confidence levels determined using the at least one speech engine; and selecting one of the plurality of languages for use in subsequently interacting with the user by selecting a language corresponding to the speech recognition result having the highest confidence level of the plurality of confidence levels determined using the at least one speech engine.

16. The at least one recordable medium of claim 15, wherein the method further comprises prompting the user for the voice utterance.

17. The at least one recordable medium of claim 16, wherein prompting the user for the voice utterance comprises rendering, in a sequential manner, a prompt in each of the plurality of languages.

18. The at least one recordable medium of claim 15, wherein:

an application having a voice interface uses a plurality of dialogs to interact with the user, each dialog being arranged to cause the application to interact with the user in a particular one of the plurality of languages;

each grammar of the plurality of grammars corresponds to one of the plurality of dialogs and the particular language of the corresponding dialog;

receiving the voice utterance comprises processing the voice utterance for each dialog using a Form Interpretation Algorithm ('FIA') corresponding to the dialog; and determining speech recognition results further comprises collecting speech recognition results, using the plurality of grammars, for each dialog according to the FIA corresponding to each dialog.

19. The at least one recordable medium of claim 15, wherein selecting the language for user interaction further comprises configuring an application having a voice interface to interact with the user in the language corresponding to the speech recognition result corresponding to the highest confidence value, wherein the configuring comprises activating an event that updates user interaction attributes of a Document Object Model representing the application.

20. The at least one recordable medium of claim 15, wherein determining the speech recognition results using the at least one speech engine comprises determining the speech recognition results using, in parallel, a plurality of speech engines.

21. The at least one recordable medium of claim 15, wherein each language of the plurality of languages is associated with a different speech engine of a plurality of speech engines, and wherein determining the plurality of speech recognition results comprises determining the plurality of speech recognition results respectively using the plurality of speech engines.

* * * * *